United States Patent [19]

Ishikawa et al.

[11] Patent Number: 5,289,532
[45] Date of Patent: Feb. 22, 1994

[54] FACSIMILE APPARATUS PROVIDING FACSIMILE TRANSMISSION WITH FORWARDABLE VOICE COMMUNICATION

[75] Inventors: Tadashi Ishikawa; Takashi Sakayama; Nobukiyo Sakai; Takashi Nakajima; Michiaki Yoshihara, all of Saitama, Japan

[73] Assignee: Fuji Xerox Co., Ltd., Tokyo, Japan

[21] Appl. No.: 766,401

[22] Filed: Sep. 27, 1991

[30] Foreign Application Priority Data

Oct. 2, 1990 [JP] Japan .................................. 2-263134
Oct. 2, 1990 [JP] Japan .................................. 2-263135

[51] Int. Cl.⁵ ........................ H04M 11/00; H04N 1/32
[52] U.S. Cl. .................................... 379/100; 358/439
[58] Field of Search .................. 379/100, 96–98, 379/93, 355–357, 210, 201, 211, 209, 67, 88, 89; 358/407, 405, 434–436, 438–440, 442, 468

[56] References Cited

U.S. PATENT DOCUMENTS

| | | | |
|---|---|---|---|
| 4,353,097 | 10/1982 | Takeda et al. | 379/100 |
| 4,785,355 | 11/1988 | Matsumoto | 379/100 |
| 4,794,639 | 12/1988 | Urui et al. | 379/89 |
| 4,825,461 | 4/1989 | Kurita et al. | 379/100 |
| 4,829,559 | 5/1989 | Izawa et al. | 379/100 |
| 4,847,891 | 7/1989 | Kotani | 379/100 |
| 4,922,524 | 5/1990 | Baba et al. | 379/100 |
| 4,942,599 | 7/1990 | Gordon et al. | 379/100 |
| 5,022,072 | 6/1991 | Sakakibara et al. | 379/100 |
| 5,125,025 | 6/1992 | Lim | 379/100 |
| 5,127,047 | 6/1992 | Bell et al. | 379/100 |

FOREIGN PATENT DOCUMENTS 62-81876 4/1987 Japan .
64-1362 1/1989 Japan .
64-42659 3/1989 Japan .

OTHER PUBLICATIONS

Xerox 3010 Facsimile Terminal Operator Manual, Copyright 1989.

Primary Examiner—Wing F. Chan
Attorney, Agent, or Firm—Finnegan, Henderson, Farabow, Garrett & Dunner

[57] ABSTRACT

A facsimile terminal capable of automatically dialing a telephone number of location where a remote operator can make a response to a voice request. In case of the remote operator being away from a remote station, a telephone communication becomes possible to send a voice message in addition to facsimile transmission.

17 Claims, 4 Drawing Sheets

FACSIMILE APPARATUS PROVIDING FACSIMILE TRANSMISSION WITH FORWARDABLE VOICE COMMUNICATION

BACKGROUND OF THE INVENTION

The present invention relates to a facsimile terminal capable of making telephone communication during facsimile transmission or after completing facsimile transmission accurately and effectively, and more particularly to a facsimile terminal capable of automatically dialing a telephone number of at a location where a remote operator can make a response to a voice request.

There are some cases in facsimile communications, where it necessary to call operator of a remote station to give liaison information such as a comment concerning image information transmitted after or during facsimile transmission. A voice request function is available in such cases, where a message or a warning sound indicating the presence of the voice request can be output visually on the display or audibly from the sound generating part of the terminal at the remote station after or during facsimile transmission.

When the remote operator who has recognized the message or warning sound, lifts the telephone receiver (handset), telephone communication becomes possible.

However, there is a problem that, in the case where the remote operator works at a place away from the location where a facsimile terminal is installed, the operator is unable to respond to the voice request. Further, the operator has no chance to know even that the voice request has been made.

Furthermore, in order to carry out the telephone communication, it is inconvenient that the operator at a transmitting station has to be kept near to the facsimile terminal until the facsimile transmission has been completed.

To solve such problem, a facsimile terminal has been proposed which is adapted so that an operator who has been away from the facsimile terminal, is, upon return able to know that a voice request has been received by observing a display that indicates that there has been a telephone message since operator could not respond to the voice request because the operator had been away from the facsimile terminal. (Published Unexamined Japanese Utility Model Application No. 42659/89).

Alternatively, a facsimile terminal has been proposed which is adapted to record a message in a voice recorder in advance if the operator at the transmitting station needs to be away from the facsimile terminal and to dial the telephone number of the remote station registered in advance to send the message (Published Unexamined Japanese Patent Application No. 81876/87 or 1362/89).

The conventional facsimile terminal as described above is disadvantageous in that the operator at the transmitting station is unable to contact the operator of the receiving station until the latter operator comes back near the facsimile terminal and therefore a required action cannot be taken at the time of emergency It is also disadvantageous in that any due information will be delayed if there is no person to respond to the voice request.

When there is no person beside the facsimile terminal and the telephone set at a destination to be contacted, telephone communication can be made conveniently, to an alternate telephone number at the location where a person to be contacted stays, but the alternate telephone number cannot be determined at the transmitting station.

SUMMARY OF THE INVENTION

An object of the present invention is to provide a facsimile terminal capable of solving the problems accompanying the conventional apparatus and allowing the transmitting station to easily recognize the telephone number of a location where a remote operator is able to respond to telephone communication.

Another object of the invention is to provide a facsimile terminal capable of making a voice request, and if no answering is made to the voice request, it is possible to easily recognize the telephone number of a location where a remote operator stays to respond to the voice request, thereby ensuring necessary communication.

The above, and other objects of the present invention is accomplished by the provision of a facsimile terminal comprising a memory means for storing the number of a telephone which is used to make telephone communication to a station transmitting facsimile transmission, the telephone number being input manually through an input means, means for adding the telephone number to an NSF signal to be transmitted to the transmitting station, and a recording means for storing the telephone number to carry out the telephone communication to a remote station.

Further they are also accomplished by the provision of a facsimile terminal comprising a memory means for storing the number of a telephone which is used to make telephone communication to a station transmitting facsimile transmission, the telephone number being input manually through an input means, a first means for detecting non-answering in response to a voice request transmitted from the transmitting station with the facsimile transmission, the first means indicating the reception of voice request, means for transmitting the telephone number to the transmitting station in response to a detection signal of said detecting means and a second means for receiving the telephone number from a remote station, the second means carrying out telephone communication according to the telephone number received.

BRIEF DESCRIPTION OF THE DRAWINGS

In the accompanying drawings:

FIGS. 6(*b*), (*c*) and (*d*) is a diagram showing the frame configuration of the protocol signal.

DESCRIPTION OF THE PREFERRED EMBODIMENTS

Figure 5:
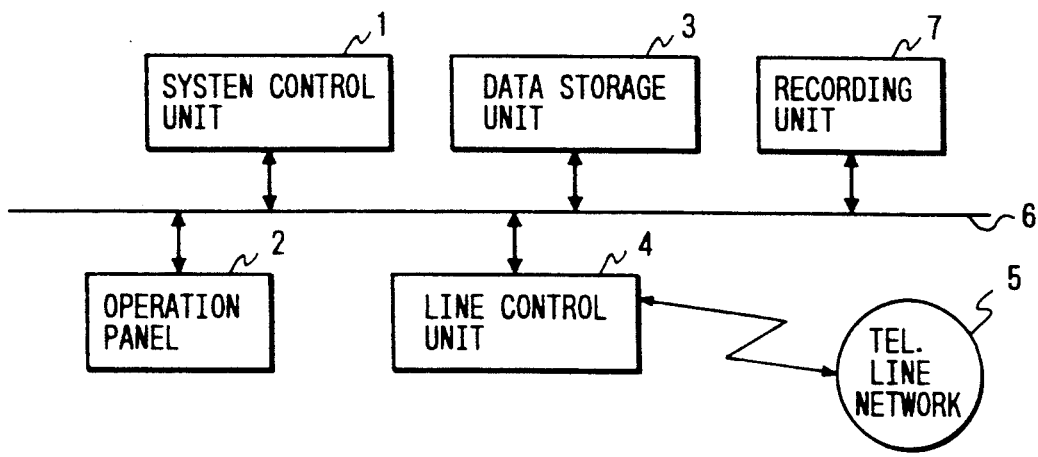
FIG. 5 is a block diagram showing the hardware configuration of the important part of the facsimile terminal.

Embodiments of the present invention will be described in detail with reference to the accompanying drawings FIG. 5 is a block diagram showing a hardware configuration of a facsimile terminal which represents an embodiment of the present invention.

In FIG. 5, coupled to a system bus 6 are a system control unit 1 including a CPU and a ROM, an operation panel 2 for applying operation instructions to the system control part 1, a data storage unit 3 including an IC memory and a hard disk for storing data necessary for the operation of the system control unit 1, data to be transmitted and data received, a recording unit 7 for printing the received data and the data stored in the data storage unit 3 and a line control unit 4 for protocol control and transmission and reception of image information.

The facsimile terminal having such configuration is connected to a telephone line network 5 through which desired transmission and reception of image information are carried out.

Figure 1:
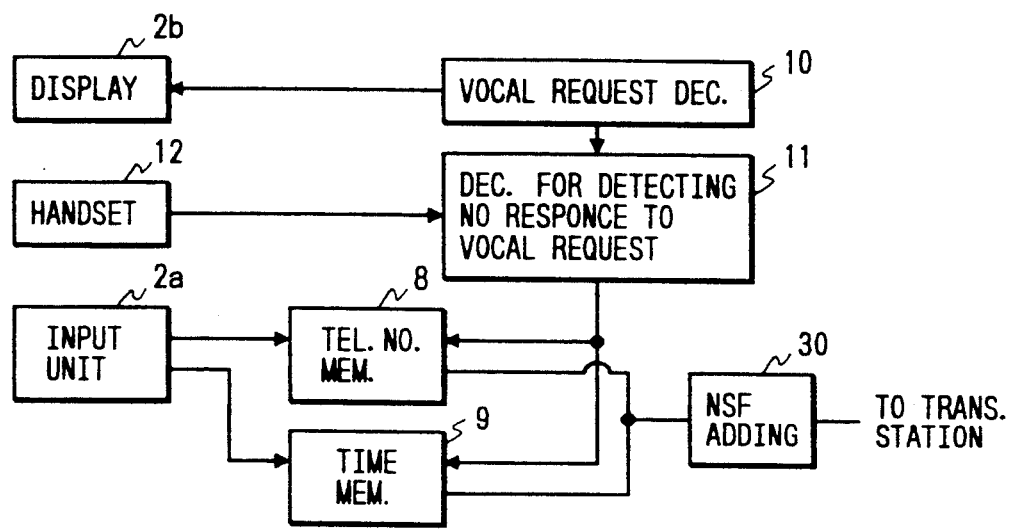
FIG. 1 is a functional block diagram of the receiving station showing the embodiment of the present invention.

The functions of main components of this embodiment will be described with reference to FIG. 1. FIG. 1 is a block diagram showing function blocks of an essential part of a o facsimile terminal serving as a remote station.

In FIG. 1, an input unit 2a includes a plurality of keys provided on the operation panel 2 and a code generating device for generating a predetermined code in response to depression of the keys.

Telephone numbers are stored in a telephone number storing memory 8. The telephone number which is stored in this memory 8 is an arbitrary telephone number which seems to ensure a response to either the originating notice by telephone from the transmitting station or the telephone communication when no answering is made to the voice request. The telephone number is entered from the input unit 2a by the operator manually.

Similarly, a time when answering can be ensured to a telephone communication is entered and registered from the input unit 2a into a specified time storing memory 9.

In an NSF adding unit 30, the telephone number and specified time are added to the non-standard function signal NSF of the protocol signal.

The transmitting station receives the receiving station information, that is, the telephone number and time data which are stored in the memories 8 and 9 in the remote station so that the transmitting station executes a predetermined processing for the originating notice on the basis of the above information.

The voice request detecting unit 10 detects the voice request contained in a protocol signal and the detection result is displayed on a display unit 2b of the operation panel 2. After a unit 11 for detecting non-response to the voice request receives the voice detection signal from the detecting unit 10, it operates to monitor the off-hook of a handset for telephone communication.

If no off-hook is detected, it is determined that no answering has been made to the voice request and the telephone number and the time data are respectively read out from the memories 8 and 9 to be transmitted to the transmitting station.

After the transmitting station receives the telephone number and time data, the station starts the predetermined processing which is to be executed when no answering is made to the voice request.

The specified time need not always be registered. In case of no specified time being registered, the transmitting station receives only the telephone number of a receiver and the station executes either the predetermined processing for the originating notice or the predetermined processing when no answering is made to the voice request.

The above described predetermined processing when the voice request is unanswered will be described with reference to FIGS. 2 to 4.

Figure 2:
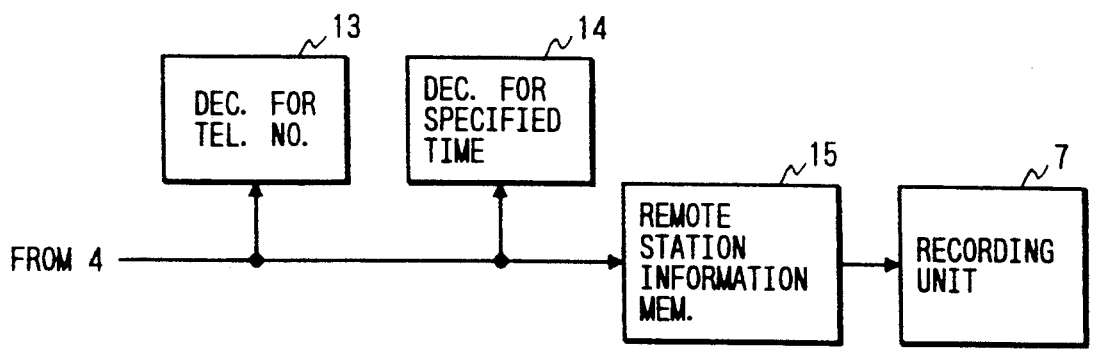
FIGS. 2, 3 and 4 are respectively a functional bock diagram of the transmitting station showing the embodiment of the present invention.
Figure 3:
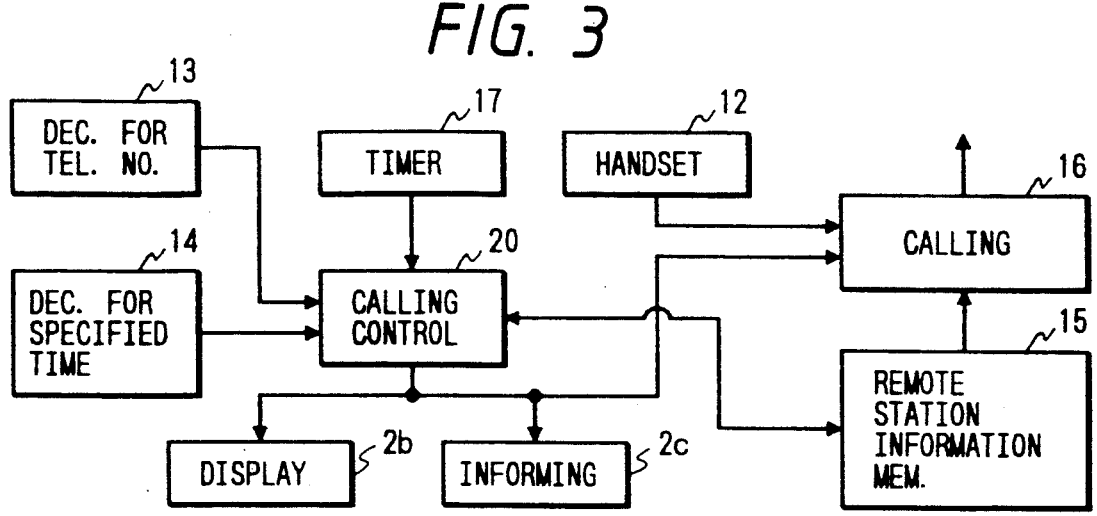
Figure 4:
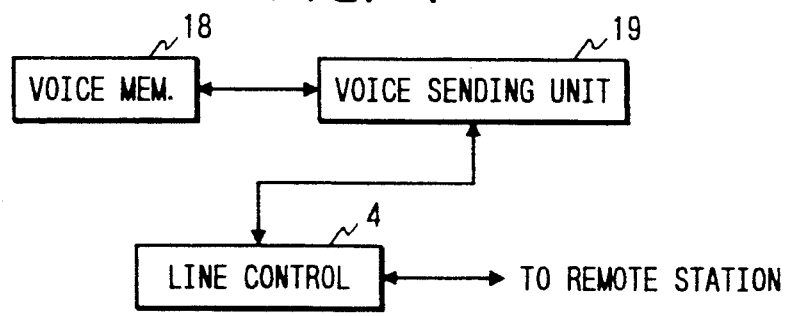

FIGS. 2 to 4 are respectively block diagrams showing the functions of the transmitting station. In FIGS. 2 to 4, like blocks have the same reference numbers.

First, in FIG. 2, the telephone number and the specified time data received through the line control unit 4 are stored in the remote station information memory 15. A telephone number detecting unit 13 and the specified time detecting unit 14 respectively detect that the telephone number and the specified time data have been received. A recording unit 7 reads out the telephone number and the time data from the receiving station information recording memory 15 to print them.

Next, in FIG. 3, the detection signals of the telephone number and the specified time are entered in a calling control unit 20. The calling control unit 20 reads the specified time data from the remote station information memory 15 in response to this detection signal so as to compare the specified time with the current time information supplied from the timer unit 17.

The calling control part 20 outputs drive signals to the display unit 2b and the informing unit 2c, respectively, when the current time reaches the specified time.

In response to the drive signal, the display unit 2b and the informing unit 2c display the predetermined message and generate a ringing tone to make the operator lifts the handset 12.

In addition, the telephone number is read from the remote station information memory 15 into a calling unit 16 in response to the drive signal.

The calling unit 16 monitors the off-hook of the handset 12 after having read the telephone number. When the off-hook of the handset 12 is detected, the calling unit 16 performs a calling operation for transmitting the telephone number to the circuit.

If no time is specified, only the telephone number detecting signal is entered into the calling control unit 20. If the specified time detection signal is not entered, the calling control unit 20 immediately outputs the drive signal to cause a preparatory operation for calling to be carried out.

Further, such a circuit component as shown in FIG. 4 can be added to the system of FIG. 3 optionally. In FIG. 4, the transmitting station is provided with a voice memory 18 for storing a message to be transmitted to the remote station and the voice sending unit 19 for sending this message.

The voice sending unit 19 receives the detection signal of an answer signal to a call signal sent out from the calling unit 16 through the line control part 4, and then the unit 19 reads out the stored message from the voice memory 18 to be sent to the remote station.

Figure 6A:
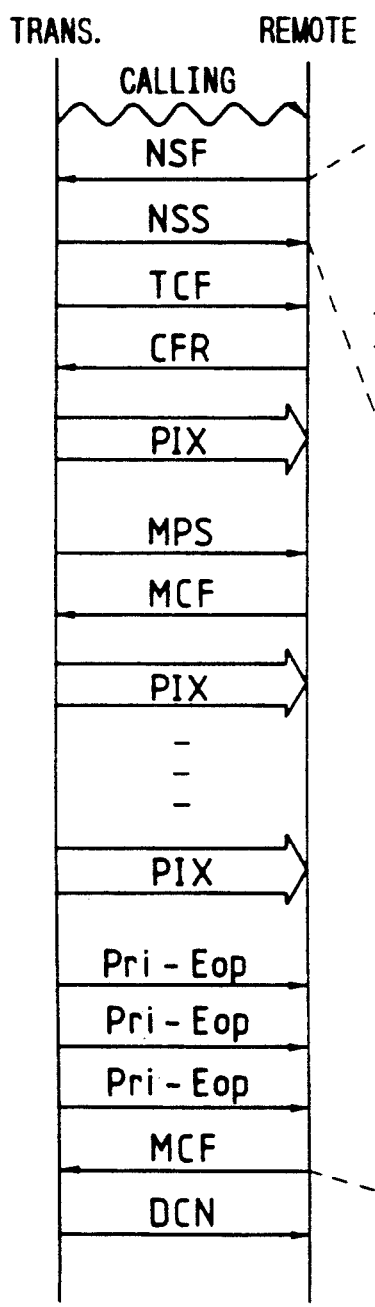
FIG. 6(*a*) is a sequence diagram showing the example protocol of the present invention.

The following describes an example of communicating operation of the system shown in FIGS. 2 to 4. FIG. 6(a) is a sequence diagram showing the communication operation.

Figure 6B:
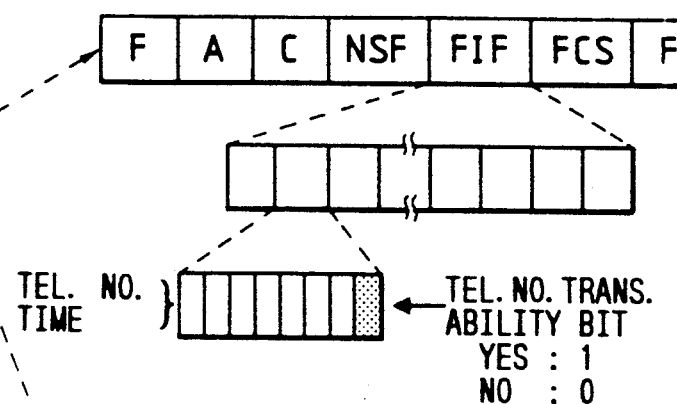

In FIG. 6(a), a ringing tone is sent out from the transmitting station and the remote station which detects the ringing tone returns the non-standard function signal NSF. In the non-standard function signal NSF, the telephone number which is freely set by a local station and read out from the telephone number memory 8, is incorporated into the nonstandard function signal NSF for the purpose of receiving the originating notice through telephone communication. In addition, a time when the originating notice can be certainly received is also set to the NSF signal. Further, in case of detecting the non-answer to the voice request, the non-standard function signal NSF includes an information showing the provision of the ability to send the telephone number which is freely set by the local station in preparation for the failure in answering to the voice request. As the frame configuration is shown in FIG. 6(b), "1" is set in advance if the telephone number sending ability is provided and "0" if it is not provided.

Figure 6C:
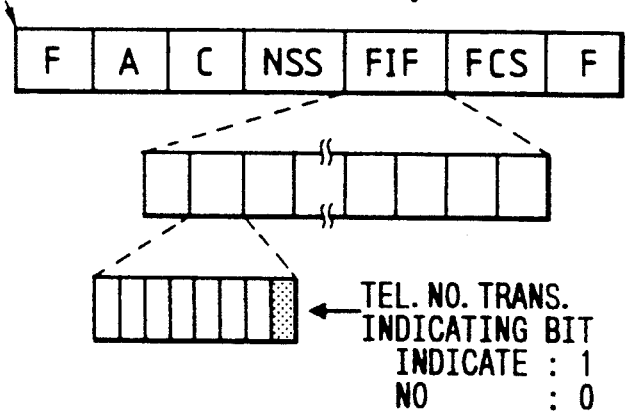

On the other hand, the transmitting station which has received the non-standard function signal NSF to which the telephone number and the specified time data are added, stores the telephone number and the specified time data in the remote station information memory 15. Alternately, the transmitting station which has detected that the non-standard function signal NSF has the telephone number sending ability, outputs a telephone number sending instruction in the non-standard function setting signal NSS. As shown in FIG. 6(c) "0" is set in the telephone number sending instruction bit if no sending instruction is required.

Since the procedure until sending the procedure step EOP signal Pri-EOP is standardized as shown in accordance with the CCITT recommendation T.30, the description is omitted.

The operation of the transmitting station for the originating notice after it has received the remote station information will be described referring to the flowchart of FIG. 7.

Figure 7:
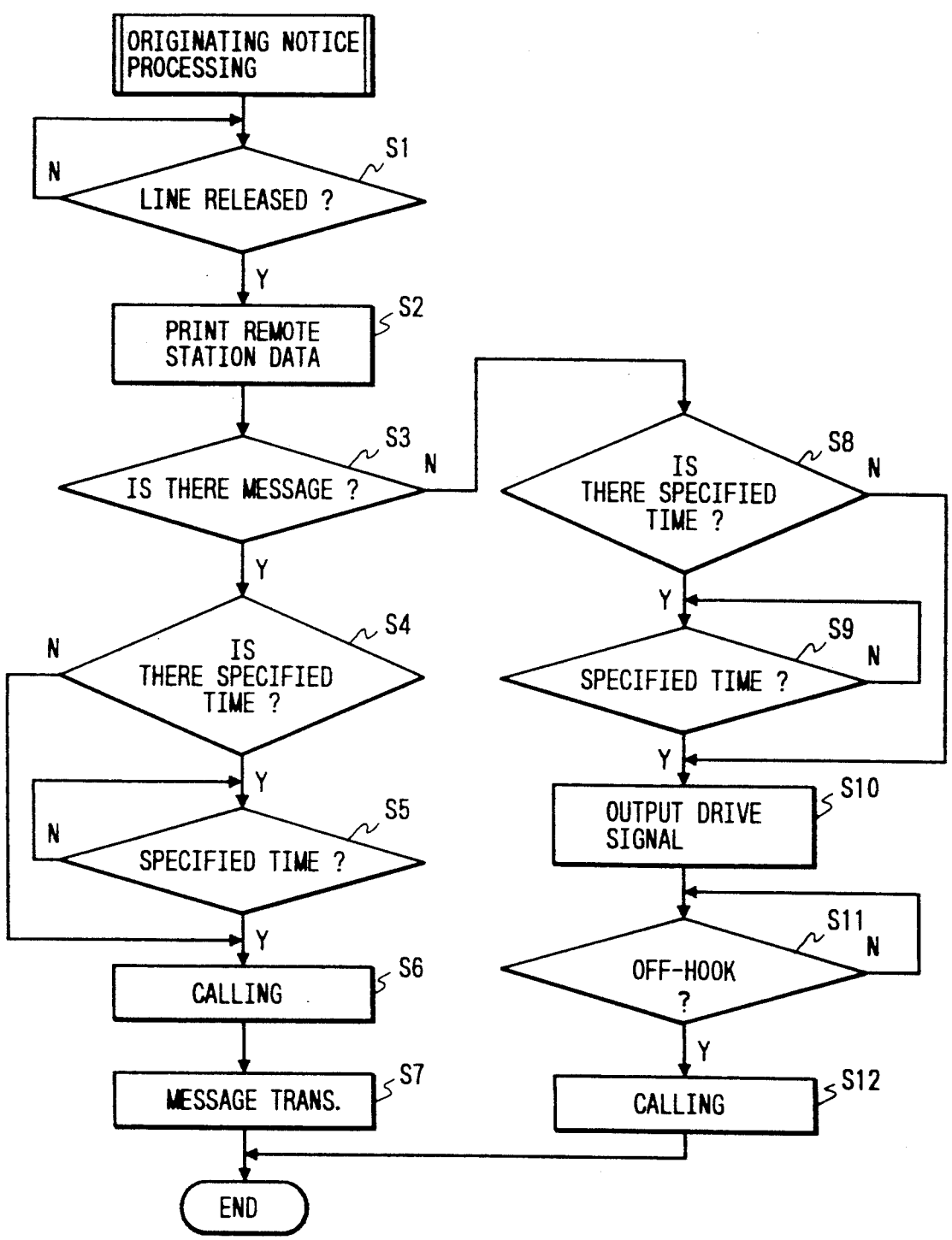
FIG. 7 is a flowchart showing the operation of a transmitting station.

In FIG. 7, whether or not the circuit is released is determined in step S1. If the circuit is released, the telephone number of the receiving station stored in the remote station information memory 15 is printed in step S2.

In step S3, whether or not a message is stored in the voice memory 18 is determined.

If the message is stored, the procedure is advanced to step S4 and whether or not the specified time has been received is determined.

If the specified time is received, the procedure is advanced to step S5 and whether or not the current time has reached the specified time is determined.

When the current time has reached the specified time, the telephone number is read out from the remote station information memory 15 to the calling unit 16 to make a call in step S6.

In step S7, a message is read from the voice memory 18 to be transmitted to the circuit.

On the other hand, if no message is stored in the voice memory 18, the procedure is advanced to step S8.

In step S8, whether or not the specified time is received is determined and, if the specified time has been received, it is monitored in step S9 that the current time reaches the specified time.

When the current time reaches the specified time, the procedure is advanced to step S10 where the drive signal is produced to the display unit 2b and the informing unit 2c to produce an instruction visually or audibly so as to make the operator lift the handset 12.

In step S11, whether the handset is lifted or not that is, is off-hooked is determined.

If the off-hook is detected, the procedure is advanced to step S12 and the call is originated.

As described above, this embodiment allows the operator of the transmitting station to call up the telephone set with a person of the remote station in attendance in high probability and automatically call up the telephone set with the telephone number sent from the receiving station by checking the telephone number and the specified time which are output by printing from the recording unit 7. In addition, a message stored can be sent out by automatic calling.

Further, in case of making the voice request, after the final image information PIX is transmitted, the procedure stop signal Pri-EOP which indicates the voice request is sent. If there is no intervening operation by the remote operator even though the procedure stop EOP signal Pri-EOP has been sent out three times, the remote station outputs the message confirmation signal MCF including the telephone number stored in said telephone number memory 8 (FIG. 1) to the transmitting station. The frame configuration of the MCF command is shown in FIG. 6(d).

When the transmitting station receives the message confirmation signal MCF, it sends out the line release instruction signal DCN to finish the corresponding facsimile transmission and stores the telephone number included in the MCF command to carry out the voice request non-answer processing as described above.

Figure 6D:
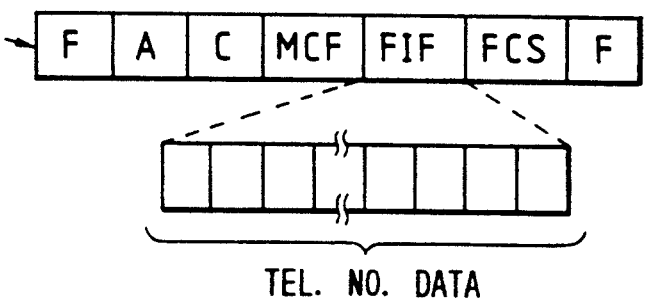

As a matter of course, not only the telephone number but also the specified time data may be included in FIG. 6(d).

In this embodiment, the communication is finished by sending the voice request Pri-EOP after the final image information is sent out. However, the voice request Pri-EOP can be sent out during the facsimile communication after a part of image information has been transmitted.

As described above, the present invention allows the operator of the transmitting station to call up the telephone set with a high probability of presence of a person of the remote station while checking the telephone number printed out on the recording unit 7 and to automatically call up the telephone set of the telephone number sent from the remote station.

As clarified from the above description, the present invention allows the operator of the transmitting station to call up the telephone set at a location where the operator of the remote station stays with a high probability at an appropriate time even though the operator of the remote station is away from the facsimile terminal and to ensure a required communication by telephone.

In the calling, the operator of the transmitting station or the facsimile terminal need not know in advance the telephone number of the location where the operator stays with a high probability.

In addition, according to the present invention, it impossible to transmit required communication information to the remote station according to a registered message while the operator of the transmitting station is still absent.

Accordingly, the present invention allows the operators of the transmitting station and the remote station to communicate necessary information regardless of the installing location of the facsimile terminal.

Further, the present invention allows the operator of location where the operator of the receiving station stays with a high probability at an appropriate time even though the operator of the remote station is away from the facsimile terminal and to ensure a required communication by telephone.

In the calling, the operator of the transmitting station or the facsimile terminal need not know in advance the telephone number of the location where said operator stays with a high probability.

In addition, the transmitting station can send out the required communication information to the receiving station according to a registered message while the operator of the transmitting station is still absent.

Accordingly, the present invention allows the operators of the transmitting station and the remote station to communicate necessary information regardless of the installing location of the facsimile terminal.

What is claimed is:

1. Facsimile apparatus comprising:
    a transmitting facsimile station;
    a receiving facsimile terminal having a memory means for storing the number of a telephone which is to be used by the transmitting facsimile station to make a telephone communication related to a facsimile transmission to be received by the terminal from the transmitting station;
    an input means for manually inputting the telephone number to the memory means;
    means for adding the telephone number to a non-standard function (NSF) signal to be transmitted from the receiving facsimile terminal to said transmitting station;
    the NSF signal being a signal indicating whether a telephone number being used in case of detecting a non-answer to the voice request exists; and
    said transmitting station having a recording means for storing the telephone number to be used for carrying out the telephone communication.

2. The facsimile apparatus as defined in claim 1 wherein said input means is a keyboard.

3. The facsimile apparatus as defined in claim 1 wherein display means is provided for displaying the telephone number stored by said recording means.

4. The facsimile apparatus as defined in claim 1 including printing means for printing the telephone number stored by said recording means.

5. The facsimile apparatus as defined in claim 1 wherein automatic dialing means sends a voice message recorded in advance to the telephone number stored in said recording means.

6. The facsimile apparatus as defined in claim 3 wherein automatic dialing means sends a voice message recorded in advance to the telephone number stored in said recording means.

7. The facsimile apparatus as defined in claim 4 wherein automatic dialing means sends a voice message recorded in advance to the telephone number stored in said recording means.

8. The facsimile apparatus as defined in claim 1 wherein said memory means further stores a specified time data for the telephone communication, the data being input through said input means manually, said adding means adds the specified time data to the NSF signal together with the telephone number, said recording means stores the telephone number and the specified time, and display means for displaying the telephone number and specified time.

9. The facsimile apparatus as defined in claim 1 wherein said memory means further stores a specified time data for the telephone communication, the data being input through said input means manually, said adding means adds the specified time data to the NSF signal together with the telephone number, said recording means stores the telephone number and the specified time, and including printing means for printing the telephone number and specified time.

10. The facsimile apparatus as defined in claim 1 wherein said memory means further stores a specified time data for the telephone communication, the data being input through said input means manually, said adding means adds the specified time data to the NSF signal together with the telephone number, said recording means stores the telephone number and automatic dialing means sends a voice message recorded in advance at the specified time to the telephone number stored in said recording means.

11. The facsimile apparatus as defined in claim 8 wherein automatic dialing means sends a voice message recorded in advance at the specified time to the telephone number stored in said recording means.

12. The facsimile apparatus as defined in claim 9 wherein said memory means further stores a specified time data for the telephone communication, the data being input through said input means manually, said adding means adds the specified time data to the NSF signal together with the telephone number, said recording means stores the telephone number and automatic dialing means sends a voice message recorded in advance at the specified time to the telephone number stored in said recording means.

13. A facsimile apparatus comprising:
    a transmitting facsimile station;
    a receiving facsimile terminal having a memory means for storing the number of a telephone which is to be used by the transmitting facsimile station to make a telephone communication related to a facsimile transmission to be received by the terminal from the transmitting station
    an input means for manually inputting the telephone number to the memory means;
    a first means for detecting non-answering in response to a voice request transmitted from said transmitting station with the facsimile transmission, said first means indicating the reception of the voice request;
    means for transmitting the telephone number to the transmitting station in response to a detection signal of said detecting means; and
    the transmitting station having a second means for receiving the telephone number from the receiving terminal, said second means carrying out telephone communication according to the telephone number received.

14. The facsimile apparatus as defined in claim 13 wherein said first means detects the non-answering by detecting whether a handset of the remote terminal is lifted or not.

15. The facsimile apparatus as defined in claim 13 wherein said second means comprises memory means for storing a voice message, and said second means dials the received telephone number to transmit the voice message automatically.

16. The facsimile apparatus as defined in claim 15 wherein said memory means further stores a specified time data for the telephone communication, the data being input through said input means manually, and said transmitting means transmits the specified time data together with the telephone number to said transmitting station, and wherein said second means starts the transmission of the voice message at the specified time.

17. The facsimile apparatus as defined in claim 13 wherein said memory means further stores a specified time data for the telephone communication, the data being input through said input means manually, and said transmitting means transmits the specified time data together with the telephone number to said transmitting station, and wherein said second means starts the telephone communication at the specified time.

* * * * *